W. D. Guseman,
Sawing Shingles,
Nº 19,193. Patented Jan. 26, 1858.
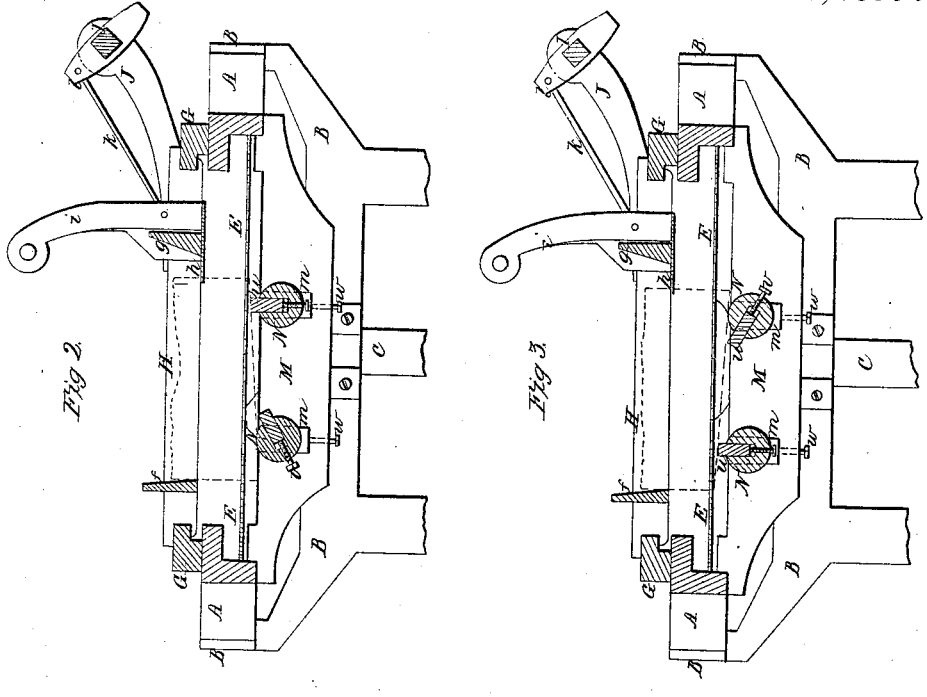
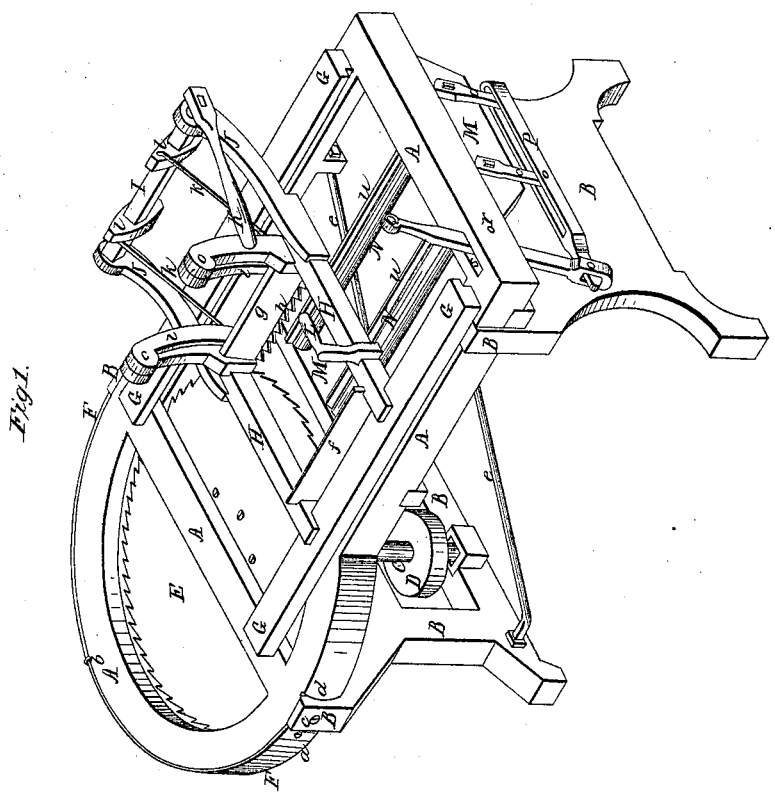

UNITED STATES PATENT OFFICE.

W. D. GUSEMAN, OF MORGANTOWN, VIRGINIA.

DEVICE FOR SHIFTING THE BOLT TO EFFECT THE TAPER IN SHINGLE-MACHINES.

Specification of Letters Patent No. 19,193, dated January 26, 1858.

*To all whom it may concern:*

Be it known that I, W. D. GUSEMAN, of Morgantown, in the county of Monongalia and State of Virginia, have invented certain new and useful Improvements in Shingle-Machines; and I do hereby declare the following to be a full, clear, and exact description of the construction and operation of the same, reference being had to the accompanying drawings, making part of this specification, in which—

Figure 1, is a perspective of the machine, and, Figs. 2 and 3, transverse vertical sections, showing the devices for catching the bolt or block when released from the dogs of the traveling carriage, in their different positions, for alternating the butt and point of the shingle, and giving it its thickness, and taper.

Similar letters of reference, where they occur in the separate figures, denote like parts of the machine in all of them.

My invention consists in the peculiar device, for receiving the bolt, every time it is dropped from its carriage, so as not only to change the ends thereof from which the butts and points of the shingles are cut, but also to regulate the taper, and thickness of the shingle as may be required.

To enable others skilled in the art to make and use my invention, I will proceed to describe the same with reference to the drawings.

The bed A, and its supports B, may be made entirely of iron. In suitable bearings connected to one set of its supports or legs, runs the spindle or shaft C—it being driven by a belt passing around its pulley D. The top of this spindle has a washer or flange upon it, which may fit nicely into a countersunk hub or plate on the underside of the saw E and by which the saw is secured to said shaft. That part of the bed or table A, near the saw E, is circular, and projects slightly over the saw, which runs underneath said table, and to the outer part of said rounded table, is hinged or pivoted at the points *a* (one only been seen) a curved segment F, of metal or other material, which hangs down around the saw, and held in place by a catch *b;* the object of this piece F, is to cover the saw, and prevent accidents, and when the saw is to be removed for filing or other purposes, this piece can be swung up out of the way, and the saw slipped out from underneath the table. The legs or support B, at that end of the machine, are pivoted to the table, at *c*, and the table slightly rounded off at that point, as at *d*, so that by means of the stay rods *e, e*, the saw spindle may be kept perpendicular, and the saw parallel to the bed or table, or the ways on it.

G, G, are ways attached to the top of the table A, upon which the carriage H, is to traverse for carrying the bolt past the saw, and to return it again, to be reset for the next operation. The carriage H, has two head blocks *f, g*, one or both of which may be made adjustable on the carriage, so as to hold bolts of different lengths. The head block *f*, may have spurs or points of any kind to sink into and hold the bolt firmly at that end, and underneath the other head block *g*, a swinging dog *h*, works to catch and hold its other end. The dog *h*, is connected to two pivoted arms *i, i*, and these arms *i, i* are connected by rods *k, k*, to the blocks *l, l*, on the rock shaft I, which is supported in the projecting pieces J. On one end of the rock shaft I, is a hand lever K, by which the operator dogs, and undogs the bolt of wood from which the shingles are to be cut.

L, is a hand piece which the operator grasps to run the carriage and the bolt up to the saw, and to draw them back again after the shingle has been cut off.

Underneath the table, are permanently fixed two supporting pieces M, M, which have slots cut in them, to receive boxes *m m*, that support the journals of the rocking pieces N, N. The ends of the rocking pieces N, next where the operator stands, project through the supporting piece M, as seen at *n, n*, and to these ends are attached arms *o, o*, the lower ends of which are pivoted to the bar P, and to one end of this bar P, is affixed a lever Q having its fulcrum at *r*, and extending up into convenient position for the operator to grasp, and so that by working said lever through its slot *s*, both of the pieces N N, shall be turned or rocked on their journals, to a given extent and there remain. The pieces N, N, have longitudinal grooves cut in them, into which are inserted tongues *u, u;* and set screws *v, v*, pass through said pieces N, and their points bear against the backs of these tongues *u*, so as to force them out of, or draw them into, their grooves. There are set screws *w, w*, also underneath the boxes *m, m*, that support the journals of the rocking pieces N, and by which said boxes may be raised or lowered at pleasure. The adjustment of the boxes m, is to give the desired thickness to the shingle, and the adjustment of the tongues u, to give it its required taper. The two pieces N, N, are so set in their common bar P, as that when the tongue of one is vertical, and supporting the shingle-bolt, the tongue of its fellow, shall be so far out of the way as to allow the bolt to rest on the piece N, itself, instead of its tongue, and thus the inclination is given to the bolt, that determines the butt and point of the shingle.

The operation of the machine is as follows: The carriage and bolt secured in it, having been run up to and past the saw, so as to cut off the shingle for which it was set, and returned to that end of the machine where the operator stands—he first reverses the lever Q, which changes the pieces N—detaches the bolt from its dogs by the lever K, which allows the bolt to drop onto the pieces N, N, as shown in Figs. 2, 3, the red lines representing the bolt, and as soon as it is dropped, the dogs are stuck into it by reversing the lever K—the bolt then has its proper set for the next shingle, and by taking hold of the hand piece L, the carriage is again run past the saw, and so on—the tongues u, and boxes m, through their set screws, admitting of such adjustment as will give the desired taper, as well as thickness to the shingle.

Having thus fully described the nature and object of my invention what I claim therein as new and desire to secure by Letters Patent, is—

The rocking pieces N, N, with their adjustable tongues u, u, and boxes m, m, for forming a bed to receive the bolt, and reverse its inclination, so as to cut off the shingles butt and point, and adjust their taper, and thickness, as herein set forth.

W. D. GUSEMAN.

Witnesses:
SAMUEL HOWELL,
R. P. HENNEN.